Oct. 7, 1969     W. E. PFEIFFER     3,470,626

GRAIN DRYING APPARATUS

Filed Dec. 7, 1967

INVENTOR
WILLIAM E. PFEIFFER
BY

*Hood, Gust & Irish*

ATTORNEYS

United States Patent Office 3,470,626
Patented Oct. 7, 1969

3,470,626
GRAIN DRYING APPARATUS
William E. Pfeiffer, Indianapolis, Ind., assignor to Farm Fans, Inc., Indianapolis, Ind., a corporation of Indiana
Filed Dec. 7, 1967, Ser. No. 688,752
Int. Cl. F26b 21/06
U.S. Cl. 34—46            2 Claims

ABSTRACT OF THE DISCLOSURE

Grain drying apparatus including a storage bin having a perforated floor defining an air space therebelow, a blower for supplying air to the space for upward flow through the perforated floor, a fluid fuel heater for heating the air supplied by the blower, and an automatic control for the heater. The automatic control comprises electrically-operated control means for energizing and deenergizing the heater and a control circuit connected between the control means and an electrical power source and including a humidistat and first and second thermostats. The humidistat and first thermostat are connected parallel and the second thermostat is connected in series with the first thermostat and humidistat, the humidistat and thermostat being disposed in the space below the perforated floor of the bin.

BACKGROUND OF THE INVENTION

Field of the invention

The present invention relates to grain drying apparatus incorporating a drying bin with means for supplying heated air thereto, and an automatic control system for controlling the temperature and humidity of the air supply to the bin.

SUMMARY OF THE INVENTION

One form of conventional grain drying apparatus includes a storage bin having a perforated drying floor defining a space thereunder into which dry air is forced for upward flow through the perforated floor. Conventionally, a blower is arranged to force air into the space beneath the drying floor, and a fluid fuel burner is employed for heating the air. The static pressure created under the drying floor by the operation of a fan results in the movement of warm, dry air upwardly through the grain stored in the bin. The moisture level to which grain will dry is determined by the relative humidity of the drying air; and, in fact, the moisture content of the air-dried grain is directly proportional to the moisture content of the air passed through the grain during the drying process.

The present invention comprises such a storage bin, blower, and burner, and an automatic control for controlling the temperature and humidity of the air supplied to the space beneath the drying floor by energizing and deenergizing the burner.

The automatic control includes an electrically-operated control means, such as a solenoid-operated valve for opening and closing the fuel supply line to the burner. A control circuit is coupled between the solenoid-operated valve and an electrical power source, the control circuit comprising a humidistat and first and second thermostats. The humidistat and first thermostat are connected in parallel and the second thermostat is connected in series with the humidistat and the first thermostat. The humidistat and thermostats are disposed in the space beneath the drying floor.

Generally, in grain drying, the fan is operated continuously and the burner is operated as necessary to control the temperature and humidity of the air in the space under the drying floor.

The control circuit, i.e., the thermostats and the humidistat, is mounted directly in the bin wall under the drying floor. Preferably, it should be mounted at least four to five feet away from the point at which the burner and the fan are connected the bin wall. Thus, the thermostats and humidistat sense and thereby control the temperature and humidity of the space under the drying floor.

Preferably, the humidistat is used to maintain constant drying air humidity by automatically cycling the burner, i.e., turning it on when the drying air humidity is above a predetermined level and off when the humidity falls below the predetermined level. The thermostat connected in parallel with the humidistat will automatically override the humidistat when the humidistat becomes ineffective due to colder outside temperatures, the circuit through this thermostat being closed when the temperature in the space under the drying floor is below a predetermined level, such as 40° F. If the humidistat is set at a value such as 45% and the thermostat in parallel with the humidistat is set at a value such as 40° F., current will flow through one or both legs of the parallel circuit if the humidity is greater than 45% and/or if the temperature is less than 40° F. The second thermostat, i.e., the thermostat in series with the parallel arrangement of a thermostat and a humidistat, is preferably set, for grain-drying applications, at a relatively high temperature, such as 100° F., to deenergize the burner when the temperature in the space under the drying floor reaches that level. This second thermostat prevents over drying of the grain as well as a grain fire should any of the other controls fail to operate. It will be apparent, therefore, that the burner will only be energized when the second thermostat and either the first thermostat or the humidistat is closed.

It is accordingly an object of the present invention to provide improved grain drying apparatus incorporating a storage bin having a perforated drying floor, means for supplying air to the space beneath the drying floor for upward flow therethrough, means for heating the air supplied to such space, and automatic control means for controlling the temperature and humidity of the air supplied to such space.

The above-mentioned and other features and objects of this invention and the manner of attaining them will become more apparent and the invention itself will be best understood by reference to the following description of an embodiment of the invention taken in conjunction with the accompanying drawings wherein:

DESCRIPTION OF THE PREFERRED EMBODIMENT

Figure 1:
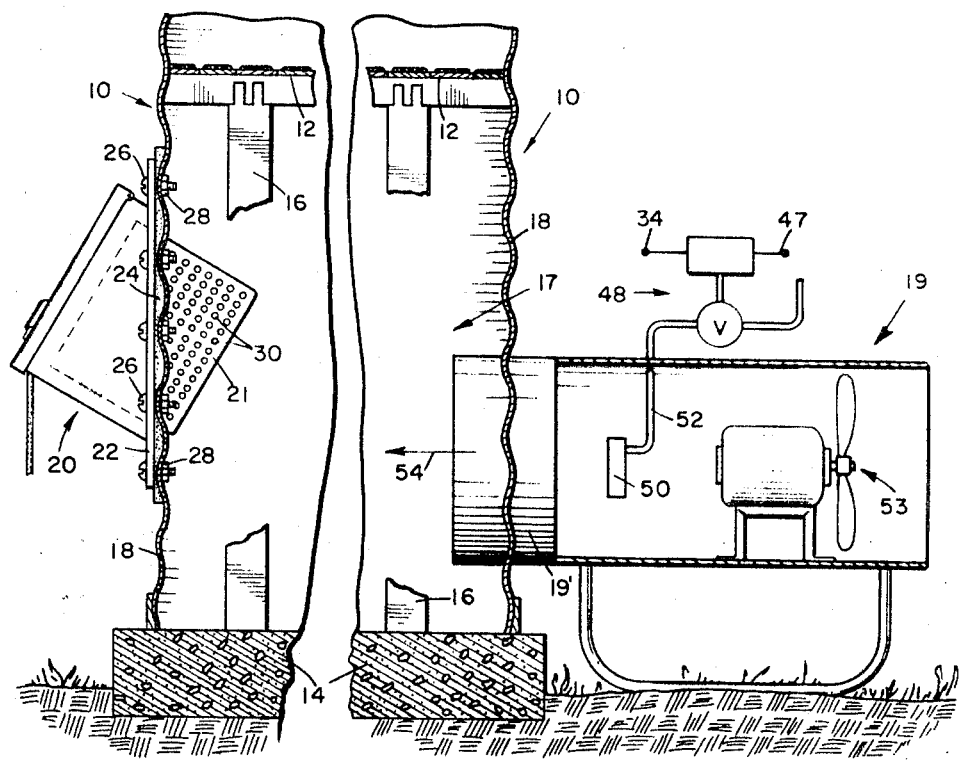
FIG. 1 is a fragmetary, sectional view of a lower portion of a grain-drying bin showing the space under the drying floor, a control box mounted so that a portion thereof extends inwardly into the space and means for supplying warm, dry air to the space.

Referring now to the drawings, it will be seen that there is illustrated a portion of a grain-drying bin, indicated generally by the reference numeral 10, of the type including a drying floor 12 supported a distance such as ten or twelve inches, above a concrete floor 14 by means of legs 16, only two of which are shown. The drying floor 12 is perforated so that the air forced into the space between the drying floor 12 and concrete floor 14 will move upwardly through the grain stored in the bin 10 on the drying floor 12. The space 17 between the drying floor 12 and concrete floor 14 is defined by the corrugated wall 18 which comprises the wall of the bin 10. Means, indicated generally by the reference numeral 19, is provided for supplying heated air to the space 17, the means 19 being connected to the space 17 by the illustrated conduit 19′.

The preferred structure of the means 19 will be discussed further as this description progresses.

Mounted in the wall 18 is a control box indicated generally by the reference numeral 20, the control box being provided with a perimetrally extending flange 22 which abuts the wall 18. Preferably, a corrugated gasket 24 is disposed between the flange 22 and the wall 18 as shown in FIG. 1, and the flange 22 is pulled tightly down against the gasket by means such as the illustrated screws 26 and nuts 28.

Preferably, the portion 21 of the control box 20 which extends inwardly into the space 17 is perforated as indicated by the reference numeral 30. The control box 20 contains components shown in the schematic diagram of FIG. 2, the components being arranged to sense the humidity and temperature of the space 17.

Figure 2:
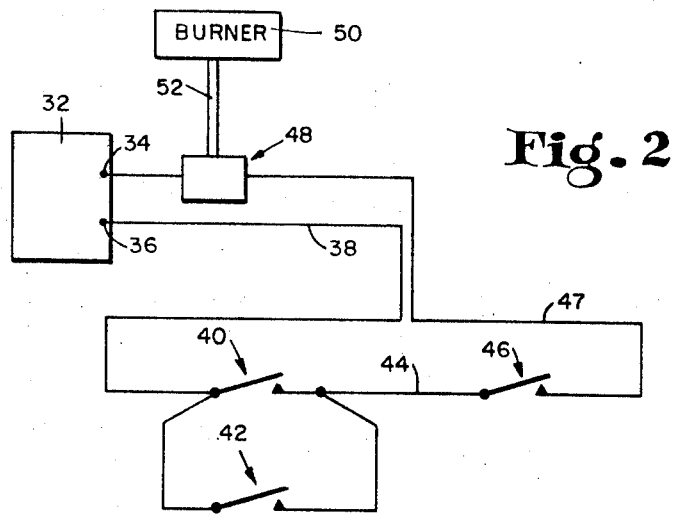
FIG. 2 is a schematic view showing the components comprising the heater control of the present invention connected in a circuit.

Referring to FIG. 2, it will be seen that there is indicated an electrical power source 32 having supply terminals 34 and 36. The terminal 36 is connected through a line 38 to one side of a conventional humidistat, indicated generally by the reference numeral 40, and to one side of a conventional thermostat, indicated generally by the reference numeral 42, the other sides of both the humidistat 40 and thermostat 42 being connected by a line 44 to one side of another conventional thermostat 46. The other side of the thermostat 46 is connected by a line 47 through a control means 48 to the terminal 34 of the power source 32.

The control means 48 is arranged to energize and deenergize the burner indicated by the reference numeral 50. In the preferred embodiment of the present invention, the burner 50 is a gas burner and the control means 48 is a solenoid-operated valve disposed in the gas line 52 (FIG. 1) connecting the burner 50 to a fuel source. Preferably, when current flows between the terminals 34 and 36, i.e., when the thermostat 46 and either the humidistat 40 or the thermostat 42 are closed, the control means 48 is operated to energize the burner 50.

Preferably, for grain-drying applications, the thermostat 42, referred to as the "minimum thermostat," is adjusted so that it will be closed when the temperature in the space 17 is below a first predetermined level, such as 40° F., and open when the temperature in the space 17 is above that level; the humidistat 40, referred to as a "maximum humidistat," is adjusted so that it will be closed when the humidity in the space 17 is above a predetermined level, such as 45°, and open when the humidity in the space 17 is less than that level; and the thermostat 46, referred to as the "maximum thermostat," is adjusted so that it will be closed when the temperature in the space 17 is less than a second predetermined level, such as 100° F., and open when the temperature in the space exceeds that level.

Grain-drying methods generally contemplate the continuous forcing of air into the space 17 during the entire drying period. The heater (burner 50) is cycled to control the temperature and humidity of the drying air. Thus, the illustrated means 19 (FIG. 1) includes a fan 53 arranged continuously to force air in the direction of the arrow 54 past the burner 50 and into the space 17.

While there have been discussed above the principles of this invention in conjunction with specific apparatus, it is to be clearly understood that this description is made by way of example and not as a limitation to the scope of the invention.

What is claimed is:

1. Grain-drying apparatus comprising a storage bin having a perforated floor disposed above a permanent floor and defining an air space, means for supplying air to said space, heat-producing means disposed to heat the air supplied to such space, electrically-operated control means for energizing and deenergizing said heat-producing means, a control box mounted in the wall of said bin to extend into said space, a control circuit adapted to be connected between said control means and an electrical power source, said control circuit comprising a humidistat and first and second thermostats, said humidistat and said first thermostat being connected in parallel, and said second thermostat being connected in series with said humidistat and first thermostat, said humidistat and said thermostats being disposed in the portion of said control box extending into said space, the circuit through said first thermostat being closed when the temperature in said space is below a first predetermined level and open when the temperature in said space is above the first predetermined level, the circuit through said second thermostat being closed when the temperature in said space is below a second predetermined level which is higher than the first predetermined level and open when the temperature in said space is above the second predetermined level, and the circuit through the humidistat being closed when the humidity in said space is above a predetermined level and open when the humidity in said space is below the predetermined level.

2. Grain-drying apparatus as in claim 1 further comprising means providing a seal between said control box and the wall of said bin, and wherein the portion of said control box extending into said space is perforated.

References Cited

UNITED STATES PATENTS

| | | | |
|---|---|---|---|
| 1,509,533 | 9/1924 | Thelen | 34—46 X |
| 2,090,131 | 8/1937 | Koch | 34—46 |
| 2,262,057 | 11/1941 | Shaw | 34—46 |
| 2,855,697 | 10/1958 | Barre | 34—46 |
| 3,217,424 | 11/1965 | Johnson et al. | 34—48 |

FREDERICK L. MATTESON, JR., Primary Examiner

ROBERT A. DUA, Assistant Examiner